United States Patent Office 3,555,016
Patented Jan. 12, 1971

3,555,016
WATER-INSOLUBLE STYRYL DYESTUFFS
Richard Peter and Hans Joerg Angliker, Basel, Switzerland, assignors to Ciba Limited, Basel, Switzerland, a company of Switzerland
No Drawing. Filed Nov. 15, 1967, Ser. No. 683,128
Claims priority, application Switzerland, Nov. 16, 1966, 16,444/66
Int. Cl. C09b 23/14
U.S. Cl. 260—240          6 Claims

ABSTRACT OF THE DISCLOSURE

Styryl dyes containing a heterocyclic carbamate group bound via an alkylamino bridge to the coupling component of the styryl moiety. The dyes are particularly useful in the so-called thermosol process.

---

The present invention is based on the observation that new and valuable water-insoluble styryl dyestuffs of the formula (1) 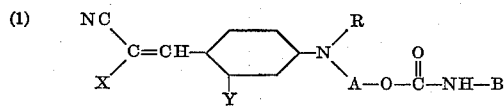

in which X represents a cyano, carbalkoxy or arylsulphonyl group, Y represents a hydrogen atom or an alkyl group, R represents an alkyl group or a residue of the formula $$-A-O-\underset{\underset{O}{\|}}{C}-NH-B$$

A represents an alkylene group and B represents a heterocyclic residue that is preferably at least partially hydrogenated, may be obtained by (a) condensing an aldehyde of the formula (2) 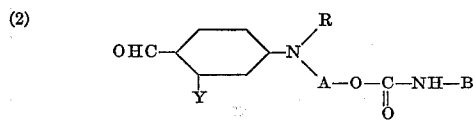

or an aldimine thereof, with a compound of the formula

or (b) condensing a styryl compound of the formula (3) 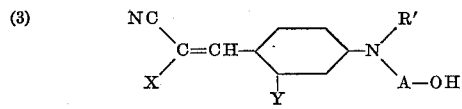

in which R' represents an alkyl group or a residue of the formula —A—OH and A, X and Y have the meanings given above, with a heterocyclic isocyanate that is preferably at least partially hydrogenated.

The compounds of the Formula 2 used as starting materials may be obtained by condensing a carbamic acid ester of an alkylaniline of the formula (4) 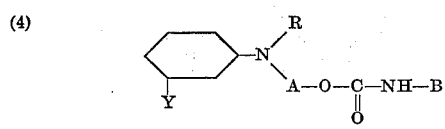

in which R, A, Y and B have the meanings given above, with dimethylformamide and phosphorus oxychloride according to Vilsmeyer, and hydrolysing the intermediate product so obtained.

Compounds that are specially useful as starting materials are aldehydes of the formula (5) 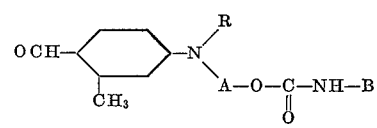

in which A, B and R have the meanings given above, and especially those of the formula (6) 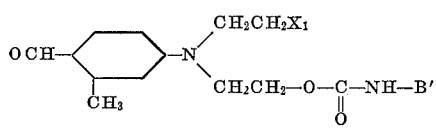

in which B' represents a 3-thienyl or a 3-sulpholan residue that may be substituted by halogen atoms or alkyl, alkoxy, carboxylic acid ester, nitrile, carboxylic acid amide, benzoyl or nitrophenyl groups, and $X_1$ represents a hydrogen atom or a residue of the formula $$O-\underset{\underset{O}{\|}}{C}-NH-B'$$

The following may be mentioned as examples:

2 - methyl - 4 - [N - methyl - N-3'-thienylcarbamyloxyethylamino]-benzaldehyde,
2 - methyl - 4 - [N-methyl-N-3'-sulpholanyl-carbamyloxyethylamino]-benzaldehyde,
2 - methyl - 4-[N-cyanoethyl-N-(thienyl-3)-carbamyloxyethylamino]-benzaldehyde,
2 - methyl - 4 - [N - methoxyethyl-N-(sulpholanyl-3)-carbamyloxyethylamino]-benzaldehyde,
2 - methyl - 4 - [N - acetoxyethyl-N-(sulpholanyl-3)-carbamyloxyethylamino]-benzaldehyde,
2 - methyl - 4 - [N - benzyl-N-(thienyl-3)-carbamyloxyethylamino]-benzaldehyde, and
2 - methyl - 4 - [N-n-butyl-N-(thienyl-3)-carbamyloxyethylamino]-benzaldehyde.

The condensation of an aldehyde of the Formula 2 with a cyano compound of the formula

is advantageously carried out with the application of heat in the presence of a basic catalyst, for example, ammonia, dimethylamine, diethylamine, piperidine, piperidine acetate or sodium or potassium alcoholate, if necessary, in the presence of a solvent, for example, methanol, ethanol, benzene, toluene, xylene, chloroform or carbon tetrachloride. When using a solvent, the water formed during the reaction can be removed continuously from the reaction mixture by azeotropic distillation of the solvent, whereby the reaction equilibrium is shifted constantly in favour of the condensation product. Condensation may also be effected without a basic catalyst in glacial acetic acid or in some other organic acid, or in the absence of a solvent by fusing the reactants together in the presence of a basic catalyst, for example, ammonium acetate or piperidine acetate.

The aldehydes can be replaced by the aldimines thereof, that is to say, the condensation products obtained with primary amines, especially aminobenzenes, in other words, the so-called Schiff's bases of the formula (7)
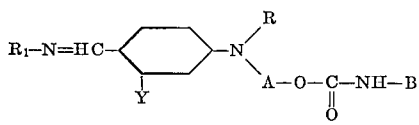

in which R preferably represents a benzene residue, for example, a phenyl or a sulphophenyl residue. The compounds of the formula (7) may be made by condensing the product obtained by reacting formaldehyde with a compound of the formula (8)
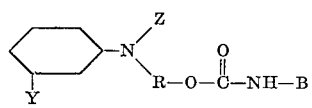

with a nitrobenzene, for example, a nitrobenzene sulphonic acid, in the presence of iron and hydrochloric acid in accordance with Example 17 of U.S. patent specification No. 2,583,551.

In process (b) of the present invention, it is advantageous to use compounds of the formula (9)
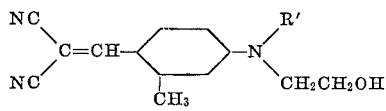

a starting materials, in which formula R' has the meanings ascribed to it in Formula 3.

These are condensed, for example, with the following isocyanates:

2-isocyanatotetrahydropyran,
2-furylisocyanate,
3-isocyanatopyridine,
tetrahydrofurfurylisocyanate,
3-isocyanatopyridine-N-oxide,
3-isocyanato-N-ethylcarbazole, and, preferably isocyanates of heterocycles containing sulphur, for example, 2-carbomethoxy-3-isocyanatothiophene,
2-isocyanato-3-cyanothiophene,
2-isocyanato-3-carbomethoxythiophene,
2-isocyanato-3-carbomethoxy-4-methylthiophene,
2-isocyanto-4-methylthiophene-3-carboxylic acid amide,
2-isocyanato-3-benzoyl-4-methylthiophene,
2-isocyanato-3-para-nitrophenyl-4-methylthiophene,
2-isocyanato-3-carbomethoxy-3,4-dimethylthiophene,
2-isocyanato-3-carboethoxy-3,4-tetramethylene-thiophene, and
3-isocyanatosulpholan.

The reaction with the isocyanate is advantageously carried out in an organic solvent which is inert towards an isocyanate group, for example, benzene, toluene or anhydrous dioxan at an elevated temperature, if necessary, at the boiling temperature of the solvent. An active solvent, for example, dimethylformamide or dimethylsulphoxide may also be used, or the reaction may be carried out without a solvent, the starting materials being heated until the reaction is complete.

The new dyestuffs are eminently suitable for dyeing and printing manmade fibres, particularly after conversion into a finely divided form, for example, by grinding, pasting, reprecipitation and so forth. Such fibres are for example those made from cellulose acetate, but especially fibres made from aromatic polyesters. They produce pure, strong, greenish yellow dyeings possessing excellent fastness to light and sublimation on the said fibres when applied by the conventional dyeing processes, for example, when applied in a dyebath containing a fine dispersion of the dyestuff and advantageously a dispersing agent at a temperature close to 100° C., if necessary, in the presence of a swelling agent, or at a temperature above 100° C.

under superatmospheric pressure. The new dyestuffs also have the advantage that they only very slightly stain wool and other fibres that may be present in the dyebath. They are therefore very suitable for dyeing union fabrics made from a mixture of polyester fibres and wool or, for example, a mixture of polyester fibres and cellulose triacetate.

The dyestuffs of the invention are also suitable for application by the so-called Thermosol process in which the fabric to be dyed is impregnated at a temperature not exceeding 60° C. with an aqueous dispersion of the dyestuff which advantageously contains 1 to 50% of urea and a thickening agent, especially sodium alginate, and is then squeezed in the usual manner, advantageously so as to retain 50 to 100% of dye-liquor based on the dry weight of the goods. To fix the dyestuff, the material so impregnated is heated to a temperature above 100° C., for example, to a temperature between 180 and 210° C., advantageously after drying, for example, in a current of warm air.

The Thermosol process described in the foregoing is particularly suitable for the dyeing of union fabrics made from polyester and cellulosic fibres, especially cotton. When used for this purpose, the padding liquor contains dyestuffs suitable for dyeing cotton, for example, vat dyestuffs, in addition to the dyestuffs of the invention. When vat dyestuffs are used, the padded fabric must be treated with an aqueous alkaline solution of one of the reducing agents commonly used in vat dyeing subsequent to the heat treatment.

The new dyestuffs may also be used in the customary manner for the spin-colouration of polyamides, polyesters and polyolefines. They may also be used in the preparation of lacquers and inks, particularly inks for ballpoint pens.

The following example illustrates the invention. Unless otherwise stated, the parts and percentages are by weight.

EXAMPLE 3.6 parts of N-ethyl-N-β-hydroxyethyl-meta-toluidine are heated for some time at a bath temperature of 90 to 95° C. in 5 parts of benzene together with 3.7 parts of 2-carbomethoxy-3-isocyanatothiophene and the benzene is evaporated after the reaction. The crude ester so obtained, which is in the form of a dark oil, is introduced at 15 to 20° C. into a mixture comprising 9.3 parts by volume of dimethylformamide and 14.3 parts by volume of phosphorus oxychloride. The batch is then heated for 5 hours at 60° C. while stirring, discharged into ice water, chloroform is added, and the pH of the mixture is adjusted to 6 with sodium hydroxide solution. The chloroform phase is separated, washed with water, dried with sodium sulphate and evaporated, the crude aldehyde remaining as a viscous, honey-like product. 7.9 parts of this product are heated under reflux for 4 hours in 40 parts by volume of methanol together with 1.5 parts of malonic acid dinitrile and 0.3 part by volume of piperidine, whereby the dyestuff soon begins to precipitate in the form of a brown-orange product. After cooling to room temperature, the precipitate is isolated by suction filtration, washed with a small amount of 95% ethanol and then dried at 60° C. 4.5 parts of the dyestuff of the formula

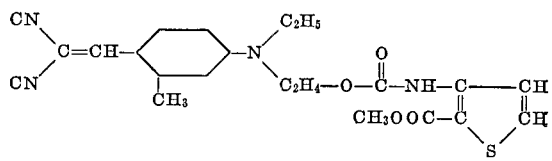

are obtained.

*Analysis.*—Calc'd (percent): S, 7.3; H, 5.1; C, 60.3; N, 12.8. Found (percent): S, 6.9; H, 5.1; C, 60.3; N, 12.9.

The following table lists components that may be used for the manufacture of further dyestuffs of the invention that dye polyester or cellulose acetate greenish yellow shades. They may be obtained by treating the N-β-hydroxyethylaminobenzene derivatives listed in Column II with the isocyanates shown in Column I, formylating the products according to Vilsmeyer and condensing the aldehydes thus obtained with the compounds shown in Column III in a manner analogous to that described in Example 1. Column IV indicates the kind of fibre on which a greenish yellow dyeing is obtained with the new dyestuffs.

solution forms. Subsequently, the excess of phosgene is blown out with nitrogen, the hot solution is filtered, and the solvent is then completely removed by distillation in vacuo. The residue consists of 3-isocyanatosulpholan and is sufficiently pure for further use.

The isocyanates corresponding to the following formulae were obtained in an analogous manner:

| Example No.: | I | II | III | IV |
|---|---|---|---|---|
| 2 | CH₃—, CH₃— thiophene with COOC₂H₅ and NCO | phenyl-N(C₂H₅)(C₂H₄OH) | CN—CH₂CN | Polyester. |
| 3 | Same as above | phenyl-N(C₂H₅)(C₂H₄OH), CH₃ on ring | CN—CH₂—COOC₂H₅ | Do. |
| 4 | benzothiophene with COOC₂H₅ and NCO | Same as above | CN—CH₂—SO₂—phenyl | Do. |
| 5 | Same as above | phenyl-N(C₂H₄OH)₂, CH₃ on ring | CN—CH₂—CN | Do. |
| 6 | benzothiophene with CN and NCO | phenyl-N(CH₃)(C₂H₄OH), CH₃ on ring | CN—CH₂—CN | Do. |
| 7 | CH₃— thiophene with COOC₂H₄ and NCO | phenyl-N(C₂H₅)(C₂H₄OH), CH₃ on ring | CN—CH₂—CN | Do. |
| 8 | sulpholane with NCO and SO₂ | phenyl-N(C₂H₅)(C₂H₄OH) | CN—CH₂—CN | Cellulsose 2½ acetate. |
| 9 | Same as above | phenyl-N(C₂H₅)(C₂H₄OH), CH₃ on ring | CN—CH₂—SO₂—phenyl | Do. |
| 10 | do | phenyl-N(CH₂-phenyl)(C₂H₄OH) | CN—CH₂—CN | Do. |
| 11 | do | phenyl-N(C₂H₄OH)₂, CH₃ on ring | CN—CH₂—CN | Do. |
| 12 | thiophene with NCO and COOC₂H₅ | phenyl-N(C₂H₅)(C₂H₄OH), CH₃ on ring | CN—CH₂—CN | Polyester. |

The isocyanates used may be prepared in the following manner:

PREPARATION OF THE ISOCYANATES 250 parts by volume of chlorobenzene are saturated with phosgene at −10 to 0° C. in a sulphonating flask. 2/10 mol of 3-aminosulpholan hydrochloride is added and rinsing is effected with 250 parts by volume of chlorobenzene. The batch is slowly heated to 115 to 130° C. with constant introduction of phosgene, and phosgene is continually added at that temperature range until a clear

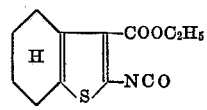

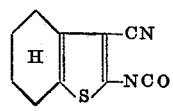

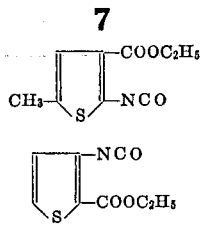

DYEING PROCEDURE 1 part of the dyestuff obtained as described above is ground wet with 2 parts of a 50% aqueous solution of the sodium salt of dinaphthylmethane disulphonic acid and the batch is dried.

The dyestuff preparation so obtained is mixed with 40 parts of a 10% aqueous solution of a condensation product derived from octadecyl alcohol and 20 mols of ethylene oxide, and then 4 parts of a 40% acetic acid solution are added. A dyebath of 4,000 parts is prepared therefrom by dilution with water.

100 parts of a cleaned polyester fibre material are entered into the dyebath at 50° C., the temperature is raised to 120 to 130° C. within half an hour, and dyeing is carried out for one hour at that temperature range in a closed vessel. The material is then well rinsed. A strong, pure, greenish yellow dyeing possessing excellent fastness to light and sublimation is obtained.

What is claimed is:

1. Water-insoluble styryl dyestuff of the formula

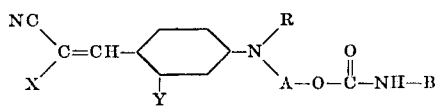

in which X represents a cyano, carbalkoxy or arylsulphone group, Y represents a hydrogen atom or methyl, R represents alkyl up to 4 carbon atoms, cyanoethyl, benzyl, acetoxyethyl, methoxyethyl or the residue of the formula

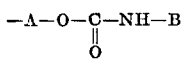

A represents an alkylene group and B represents a group consisting of the carbon skeleton of tetramethylene sulfone or thiophene.

2. A water-insoluble styryl dyestuff as claimed in claim 1 of the formula

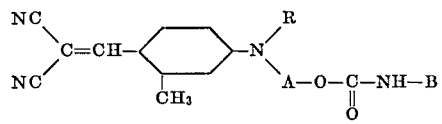

in which A, B and R have the meanings given in claim 1.

3. A water-soluble styryl dyestuff as claimed in claim 2, which corresponds to the formula

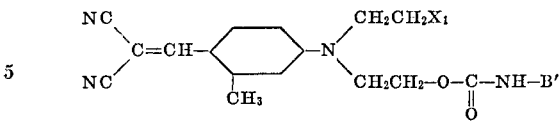

in which B' represents the residue of a thiophene or sulpholan that may be substituted by a halogen atom or methyl, alkoxy, carboxylic acid ester, nitrile, carboxylic acid amide, benzoyl or nitrophenyl group, and $X_1$ represents a hydrogen atom or the residue of the formula

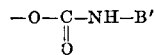

4. A water-insoluble styryl dyestuff according to claim 3 of the formula

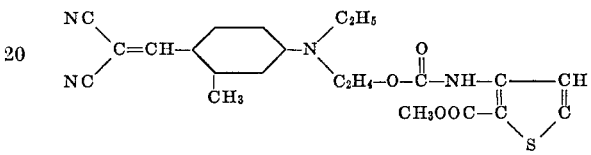

5. A water-insoluble styryl dyestuff according to claim 3 of the formula

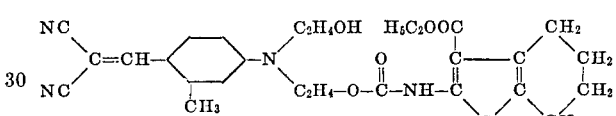

6. A water-insoluble styryl dyestuff according to claim 3 of the formula

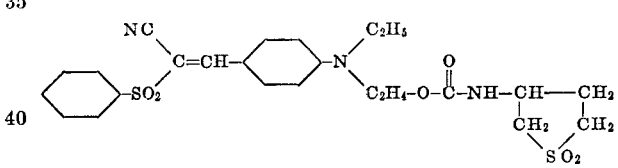

References Cited

UNITED STATES PATENTS 2,850,520  9/1958  Merian et al. _____ 260—465
3,150,164  9/1964  Martin _____ 260—332.3X JOHN D. RANDOLPH, Primary Examiner U.S. Cl. X.R.

8—178, 179, 180; 106—22; 260—240.9, 332.1, 332.2, 332.3, 315, 295, 347.4, 465